May 17, 1932.  W. E. HAUPT  1,858,446
TESTING DEVICE
Filed Aug. 1, 1930
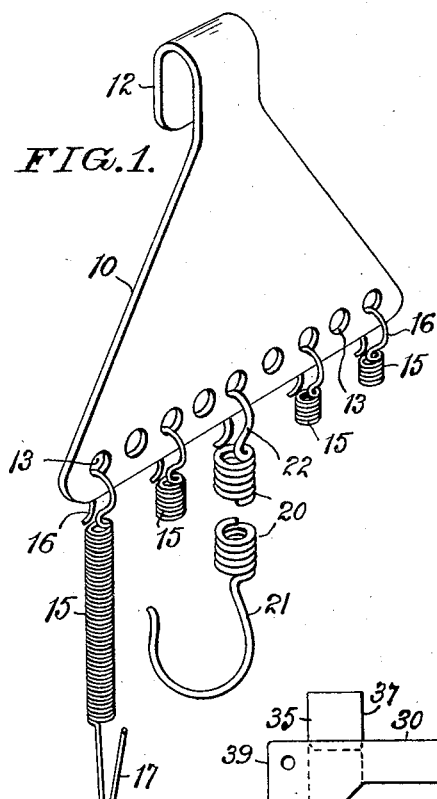
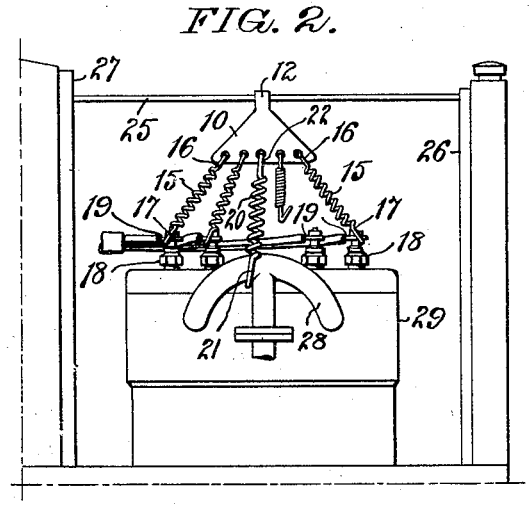
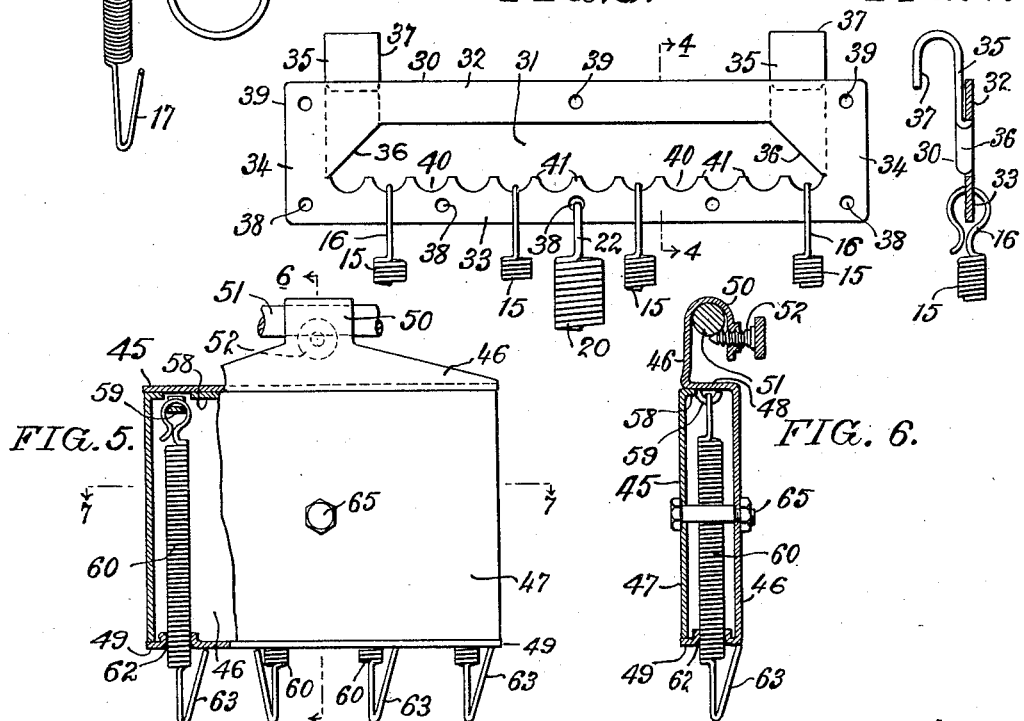
Inventor:
William E. Haupt
By F. DeWitt Goodwin
Attorney Patented May 17, 1932

1,858,446

UNITED STATES PATENT OFFICE

WILLIAM E. HAUPT, OF PHILADELPHIA, PENNSYLVANIA

TESTING DEVICE

Application filed August 1, 1930. Serial No. 472,475.

My invention relates to a testing device for engines and particularly to engines used in automobiles and aeroplanes, having spark plugs forming part of the ignition system of the engines.

The object of my invention is to provide a testing device which can be readily attached, either temporary or permanently, upon some part of the engine or frame, which is simple in construction and can be manufactured at a very low cost; a further object is to provide the holder with flexible conductors adapted to be readily attached to the spark plugs of the engine for short circuiting the plugs; a still further object is to provide conductors in the form of coiled springs which may be suspended from the holder and extended for attaching the same to the spark plugs; a further object is to provide the springs with suitable hooks upon the opposite ends thereof, which may be readily attached to the holder and to the spark plugs and quickly detached from the latter; a further object is to provide means for forming a ground connection between the holder and the engine, or frame associated with the latter, whereby the testing springs or conductors may be handled without the possibility of the operator receiving a shock, thus insuring a perfect ground connection; a still further object is to provide a relatively heavier spring which is attached to the holder and provided with a large hook at its lower end for attaching the same with the manifold of the engine for holding the holder in a rigid position and also for forming a ground connection between the holder and the engine; a still further object is to provide a form of holder of relatively long dimensions for engines of 4, 6, 8 or more cylinders and provide the holder with means for positioning the short circuiting springs at convenient positions upon the holder relatively to the spark plugs of the engine; and a still further object is to provide a form of holder which is of box like construction for concealing the springs within the box when not in use so that the latter may be attached as a fixture upon the engine. These together with various other novel features of construction and arrangement of the parts, which will be more fully hereinafter described and claimed constitute my invention.

Referring to the accompanying drawings, Fig. 1 is a perspective view of one form of my improved testing device; Fig. 2 is a side elevation of a portion of an automobile embodying my improved testing device, as shown in Fig. 1; Fig. 3 is a side elevation of another form of my testing device adapted for larger engines than that shown in Fig. 2; Fig. 4 is a vertical sectional view as on line 4—4, Fig. 3; Fig. 5 is a side elevation partly in section, as on line 5—5, Fig. 7, showing another form of my invention adapted to be permanently attached to the engine or frame; Fig. 6 is a vertical sectional view, as on line 6—6, Fig. 5; and Fig. 7 is a horizontal sectional view, as on line 7—7, Fig. 5.

In the accompanying drawings in which like reference characters refer to like parts, 10 represents a holder formed of a flat metal plate, and as illustrated in Figs. 1 and 2, is of triangular shape, having at the apex a hook 12 formed integrally with the plate 10. Along the lower edge of the plate 10 is provided a series of openings 13, in which may be inserted and supported upon the plate 10, a series of electrical conductors which are preferably in the form of coiled metal springs 15, having hooks 16 formed at their upper ends, which may be readily attached to the plate 10 by passing the hooks 16 through the openings 13 of the plate. The lower ends of the springs 15 are provided with hooks 17, of V-shape formation which may be quickly attached to the spark plugs 18 or the wire terminal 19 connected with the latter. A relatively heavier spring 20 is attached to the central portion of the plate 10 forming a brace for preventing the plate from swinging and also forming a good ground connection with the engine. Said spring 20 is provided with a large hook 21 at its lower end, adapted for embracing the intake or exhaust manifold of the engine, as illustrated in Fig. 1. The upper end of the spring 20 is provided with a hook 22 which is similar in construction to the hooks 16.

The testing device may be used by attaching the same to any suitable support associated with the engine and it is particularly adapted to be suspended from the brace rod 25 usually found upon an automobile for bracing the upper portion of the radiator 26 to the body 27 of the automobile. The hook 12 of the testing device may be readily hooked over the brace rod 25, and the heavy grounding spring 20, which is attached to the central lower portion of the plate 10, may be attached to the manifold 28 of the engine 29, by means of the hook 21, or the latter may be secured to any other convenient part of the engine to form an electrical ground connection between the plate 10 and the engine. The brace rod 25 is usually painted so that if the hook 12 merely rests upon the rod it will not make a good ground connection.

The device is used for testing the electrical circuits of the engine by attaching the hooks 17 of the springs 15 with the spark plugs 18, or with the wires 19 connected with the spark plugs. By this arrangement the springs 15 may be readily attached to all the spark plugs of the engine with the exception of one, for testing the plugs, an quickly changed to the different plugs to determine whether or not they are operating properly. The grounding spring 20 on the holder is attached to the engine and the springs 15 are attached to the spark plugs so that a good ground connection is formed between the holder and the engine, thus permitting the operator to handle the springs 15 without receiving a shock while making a test of the engine.

The plate 10 may be provided with a series of openings 13 so that any number of springs 15 may be attached for use upon engines having a greater number of cylinders than shown in Fig. 2.

Fig. 3 illustrates a form of my invention better adapted for engines having a large number of cylinders, and consists of a holder 30 formed of a single plate of metal, which may be nearly the length of the engine. The holder 30 consists of a relatively heavy plate of metal provided with a longitudinal aperture 31 forming upper and lower bars 32 and 33 connected by end bars 34. The bars 32 and 33 are formed by cutting longitudinal slits in the plate 30 so that the portions of metal between the slits form tongues 35 adapted to be folded upon themselves along the lines 36 so that the tongues will project at right angles to the length of the plate 30. Said tongues 35 are formed with hooks 37 adapted for engaging a brace rod 25 of the automobile, as shown in Fig. 2. Said hooks 37 are located adjacent to the opposite ends of the plate 30 and thereby support the latter in a horizontal position. The lower bar 33 of the plate 30 is provided with a series of holes 38 for the attachment of a ground spring 20, the lower end of which may be attached to the engine to form a ground connection with the latter. The upper bar 32 is also provided with holes 39 which may be occupied by additional supports in the form of wire hooks, not shown in the drawing. A number of short circuiting springs 15 similar to the springs 15 shown in Fig. 1, are supported upon the lower bar 33 of the holder. Said lower bar 33 is provided with a series of notches 40, formed between the protections 41, adapted for holding the hooks 16 of the springs 15, from sliding longitudinally upon the bar, when the springs are extended for attachment with the spark plugs of the engine.

Another form of my invention is illustrated in Figs. 5 to 7 and consists of a holder 45 which may be permanently carried upon the automobile, and consists of a holder formed of two plates 46 and 47. The plate 46 forms one side panel of a box like construction and also form the top 48 and bottom 49 of the box. The plate 46 is extended upward from the top panel 48 to form a hook 50 for suspending the holder from a suitable support, such as the brace rod 51 similar to the rod 25 shown in Fig. 2. The hook 50 is provided with a threaded aperture adapted to receive a threaded screw or bolt 52, so positioned that the threads of the bolt will cut into the brace rod 51 and remove the paint from the rod sufficiently to form an electrical ground connection through the rod, thus grounding the entire testing device.

The plate 47 forms the other side panel of the box, as shown in Fig. 6, and is provided with end panels 55 and 56, as shown in Fig. 7. Said plate 47 is also provided with a top supporting bar 58 formed with hooks 59 upon which the springs 60 may be supported. The bottom panel 49 of the box is provided with openings 62 through which the springs extend so that the hooks 63 will be accessible below the bottom panel of the box, as shown in Figs. 5 and 6. The plates 46 and 47 forming the side panels of the box may be secured together by a single bolt 65. The holder illustrated in Figs. 5 to 7 may be provided with any number of openings 62 so that any number of springs may be supported within the holder for use in connection with engines having a large number of cylinders. The springs 60 are nearly concealed within the panels of the box so that the holder will present a neat appearance, and may be permanently carried above the engine for testing the spark plugs, as above described.

My invention provides a device for conveniently holding a plurality of electrical conductors for testing spark plugs in engines. The testing conductors being in the form of springs will contract when not in use and will occupy a very small space, thus eliminating the possibility of the conductors being caught in the fan or any other moving parts of the engine.

My improved testing device provides a convenient means for readily connecting and disconnecting the short circuiting springs to and from the spark plugs, which are required to be alternately short circuited several times during the testing of the engine, thus providing a device for quickly and conveniently testing the engine.

I claim:—

1. A testing device comprising a holder, means upon the holder for attaching the same to a support, a plurality of coiled springs, hooks formed upon the opposite ends of the springs, said holder having an opening formed through the same through which the hooks upon said springs may be inserted and embrace a portion of the holder for supporting the springs thereon.

2. A testing device for an engine comprising a holder, means upon the holder for attaching the same to a fixed support, a spring having one end attached to the holder, a hook upon the opposite end of the spring for attaching the same to an engine to form an electrical ground connection between the holder and the engine, a plurality of flexible, resilient, electrical conductors suspended from said holder, and means upon said last mentioned conductors for quickly attaching the same to the spark plug connections of the engine for short circuiting the latter.

3. A testing device for engines comprising a holder having means for supporting the same upon a part associated with the engine, a plurality of springs attached to the holder, hooks formed upon the lower ends of the springs, one of said springs being relatively heavier than the other springs and having a relatively larger hook than the hooks of the other springs for attaching the heavier spring to a fixed part of the engine to form a ground connection with the latter, and relatively smaller hooks upon said smaller springs for attaching the latter with the spark plug connections of the engine.

4. A testing device for an engine comprising, a holder formed of a flat plate, a hook formed integral with the plate for attaching the holder to a support associated with the engine, a plurality of electrical conductors mounted upon the plate in electrical contact with the latter, and means upon the ends of the conductors opposite to the plate for quickly connecting the same with the spark plug connections of the engine.

5. A testing device for an engine comprising, a holder formed of a flat plate, a hook formed integral with the plate for attaching the holder to a support associated with the engine, a bolt upon said hook for clamping the hook around a support associated with the engine, screw threads upon the bolt positioned to engage the surface of said support to form an electrical ground connection between the holder and said support, a plurality of coiled springs forming electrical conductors mounted upon the holder, and means upon the springs for attaching the same to the spark plug connections of the engine.

6. A testing device for an engine comprising, a holder formed of a flat plate, said plate having slits cut therein extending longitudinally and parallel with one edge of the plate, the portions of the plate from between said slits being positioned at right angles to the length of the slits, hooks formed upon the free ends of said portions of the plate, and a plurality of flexible electrical conductors having end portions extending through said slits and embracing the plate.

7. A holder comprising a top bar, a lower bar in spaced relation with the upper bar, end members connecting said bars, means upon the holder for attaching the same to a support, a plurality of coiled springs suspended from the lower bar, said lower bar having notches formed therein for holding the springs against longitudinal movement upon the lower bar when the springs are resting upon the latter, and means upon the lower end of each spring for quickly attaching the same to a device to be tested.

8. A testing device for engines, comprising a holder of rectangular box like formation, means upon the holder for suspending the same upon a support associated with the engine and forming an electrical ground connection, a plurality of coiled springs suspended within the holder having their lower ends projecting from the lower edge of the holder, and means upon the lower ends of the springs for attaching the same to the spark plug connections of the engine for grounding the latter.

9. A testing device for engines, comprising a holder consisting of a plate of channel formation, a second plate of channel formation positioned adjacent to the first mentioned plate to form a hollow box like construction, a fastening device for securing said plates together, a hook formed upon one of said plates for suspending the same upon a support associated with the engine and forming an electrical ground connection, a plurality of coiled springs encased between said plates, fastening devices upon one of said plates from which the springs are suspended with their lower ends projecting below said plates and means upon the lower ends of the springs for attaching the same to the spark plug connections of the engine for grounding the latter.

In testimony whereof I affix my signature.

WILLIAM E. HAUPT.